Patented Mar. 25, 1930

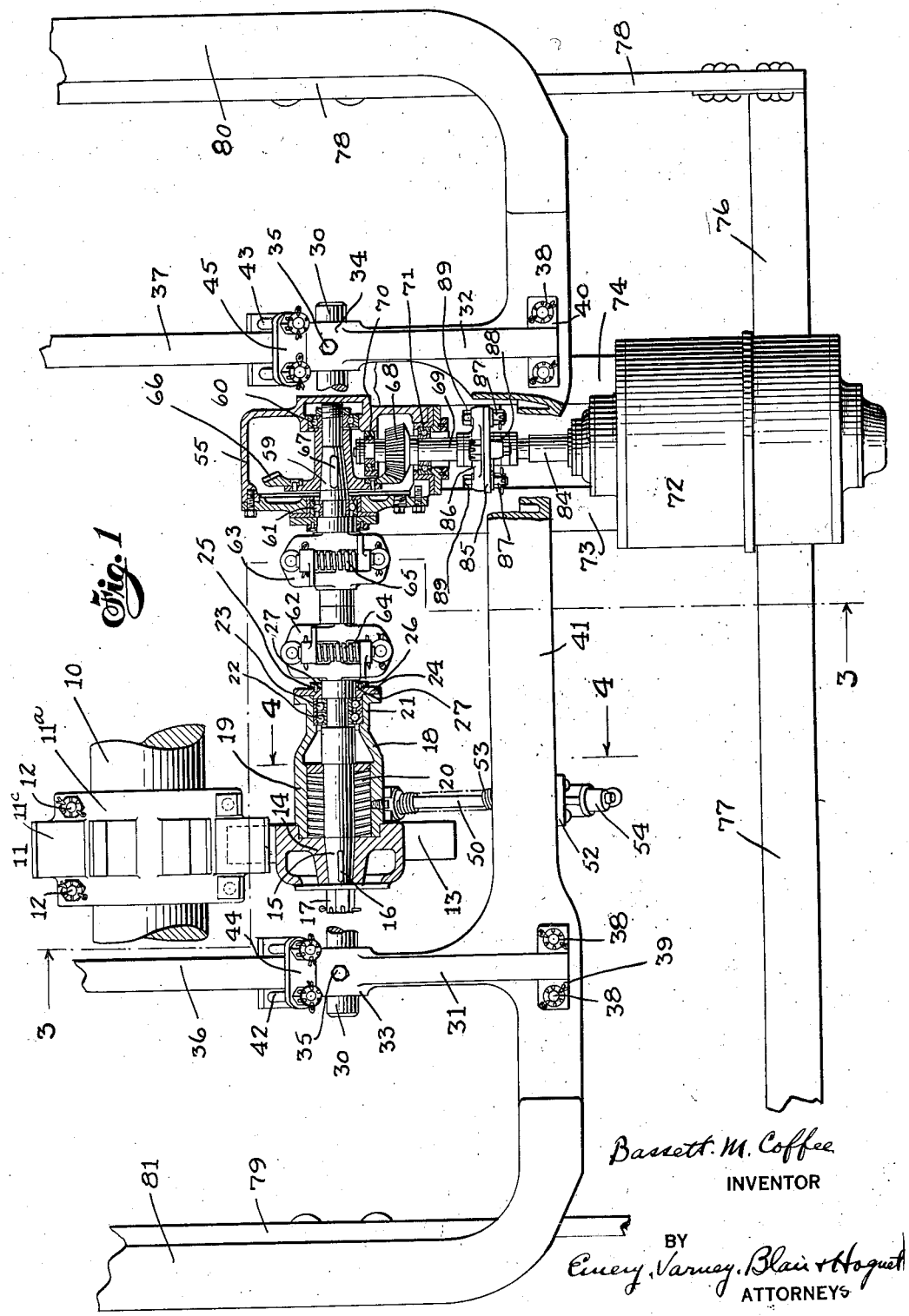

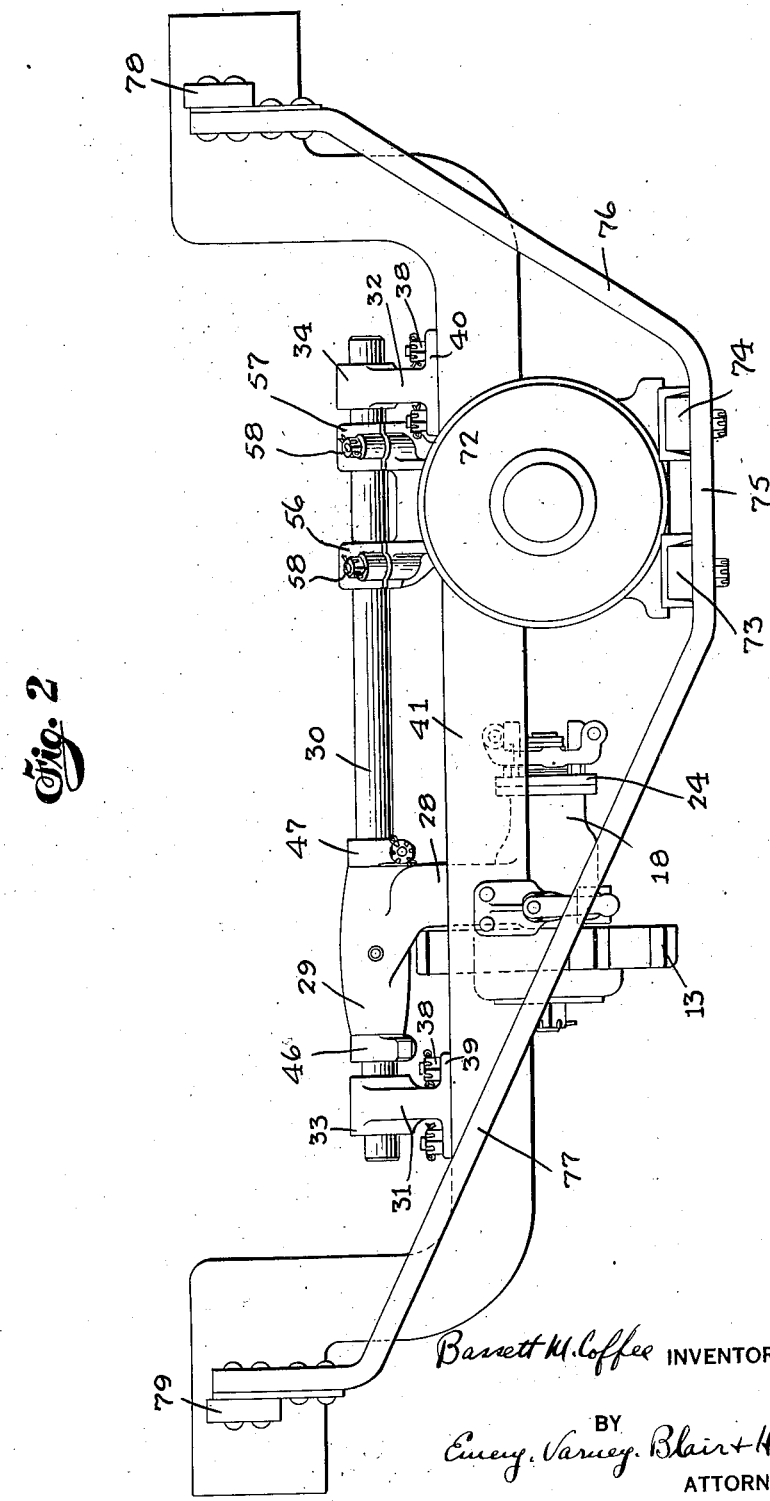

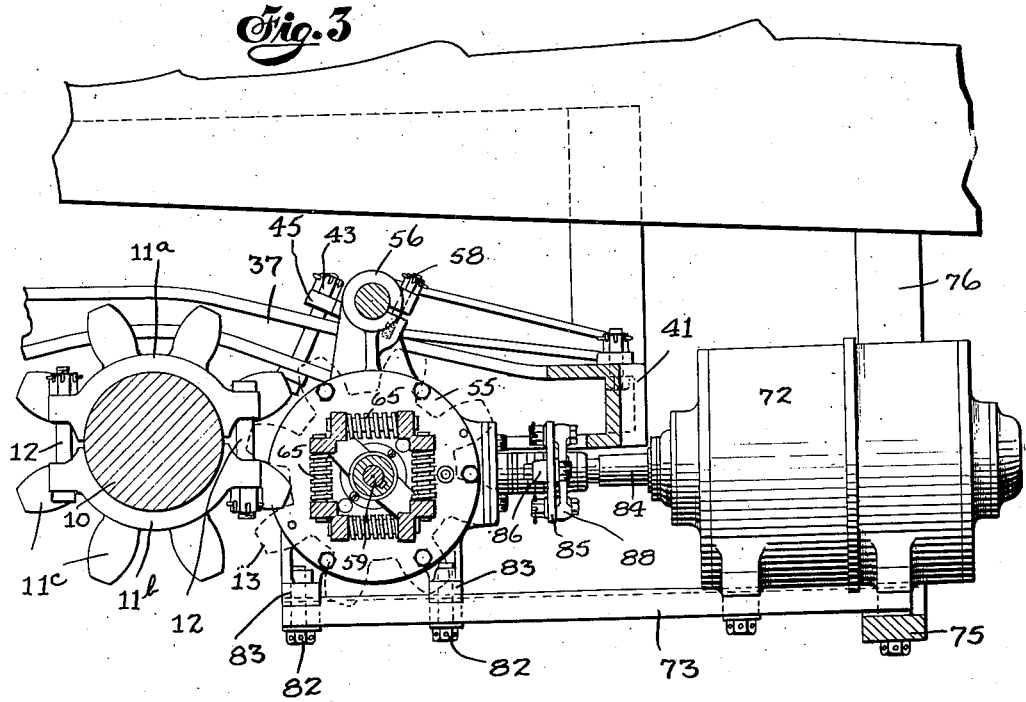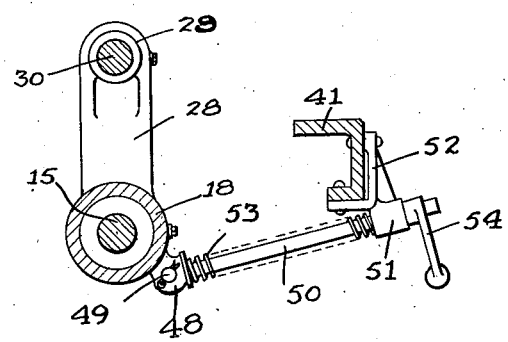

1,751,576

UNITED STATES PATENT OFFICE

BASSETT M. COFFEE, OF NEW HAVEN, CONNECTICUT, ASSIGNOR TO THE SAFETY CAR HEATING & LIGHTING COMPANY, A CORPORATION OF NEW JERSEY

POWER TRANSMISSION

Application filed March 1, 1922. Serial No. 540,155.

This invention relates to a system of transmission and more particularly to a transmission apparatus for driving an electric generator from a car axle. One of the objects of this invention is to provide a simple and practical apparatus for driving a generator from a car axle in which the disadvantages attendant with transmissions such as of the belt-driven type are avoided. Another object is to provide a transmission of the above nature of rugged and durable construction so as to attain reliable and dependable operation. Another object is to provide a gear transmission for driving a generator from a car axle of practical construction and of such nature as to permit a ready and convenient installation. Other objects will be in part obvious or in part pointed out hereinafter.

The invention accordingly consists in the features of construction, combination of elements and arrangement of parts as will be exemplified in the structure hereinafter described and shown in the accompanying drawings, and the scope of the application of which will be indicated in the following claims.

In the accompanying drawings in which is shown one of various possible embodiments of this invention, Figure 1 is a plan view partly in section of a generator transmission as associated with a car axle;

Figure 2 is an end view thereof as viewed from the bottom of Fig. 1, certain parts being omitted to show the construction more clearly;

Figure 3 is a side elevation partly in section taken on the line 3—3 of Fig. 1; and Figure 4 is a detailed, detached view taken on the line 4—4 of Fig. 1, illustrating more clearly the construction employed for mounting certain parts of the apparatus.

Similar reference characters refer to similar parts throughout the several views of the drawings.

Referring now to the drawings, and more particularly to Fig. 1, there is shown at 10 a car axle upon which is adapted to be mounted a gear 11 of relatively small diameter. The hub of this gear, as will be more clearly seen in Fig. 3 of the drawings, is split to form the two halves 11$^a$ and 11$^b$ adapted to be clamped in position upon the car axle 10 as by means of the bolts 12. The gear 11 may thus be readily secured to the car axle and conveniently positioned thereon with respect to the remaining parts of the transmission hereinafter described.

According to one of the features of this invention, the gear 11 is provided with a plurality of teeth 11$^c$, the number of teeth 11$^c$ being relatively small with respect to the pitch circle of the gear 11. The circular pitch or the ratio of the pitch circle to the number of teeth is thus made substantially large, resulting in a gear construction whose teeth are of relatively large dimensions and particularly of a relatively great length as measured in a radial direction. The resultant construction is thus one of great ruggedness, it being understood that the hub portions 11$^a$ and 11$^b$ are suitably proportioned to provide a commensurate or similar rugged construction.

The gear 11 meshes with and drives a gear 13 of substantially the same pitch diameter as the gear 11 and preferably of the same number of teeth. The gear 13 has its hub 14 tapered to fit the tapered end of the shaft 15 to which it is rigidly secured by means of the key 16 and the nut 17 threaded on the outer end of the shaft 15. The gears 11 and 13 may conveniently be cast, and thus make possible a simple and inexpensive method of manufacture thereof.

The shaft 15 upon which the gear 13 is rigidly mounted is rotatably mounted in a somewhat elongated housing 18, one end of which 19 is interiorly machined to provide a housing for the rollers 20 in which the one end of the shaft 15 adjacent the gear 13 is rotatably supported. The rollers 20 cooperating with the cylindrical portion 19 of the housing 18 thus provide a substantial and durable bearing for taking up the thrust exerted upon the shaft by the driving gears 11 and 13. In the other end of the housing 18 as at 21 the far end of the shaft 15 is rotatably mounted in suitable bearings thereby to assist in maintaining a proper alignment of the shaft 15 within the housing 18. Preferably, however, ball bearings of which a plurality may be employed, such as 22 and 23, are mounted for supporting the other end of the shaft 15. At the end of the housing 18 there is mounted a cap 24 through which the end of the shaft 15 extends and suitable means, such as a fibre or felt washer or other suitable packing material indicated generally at 25 and suitably secured to the cap 24 as by means of the annular plate 26 and screws 27 provide a substantially fluid-tight connection between the outer end of the shaft 15 and the housing 18. The housing 18 may thus function as a reservoir for a suitable lubricant to maintain the roller bearings 20 and the ball bearings 22 and 23 well supplied with lubricant.

Considering now the manner in which the housing 18 is supported to maintain the gear 13 in driving relation with the gear 11 on the car axle, it will be seen, referring now to Fig. 2, that there is integrally formed with the housing 18 an upwardly directed arm 28 terminating at its upper end in an elongated sleeve 29 supported upon the shaft or bar 30. The shaft 30 is rigidly supported upon the truck frame associated with the car axle 10 by means of suitable brackets 31 and 32 provided with suitable journals 33 and 34 respectively in which the ends of the shaft 30 are respectively supported. Suitable set screws as 35 extending into the journals 33 and 34 lock and securely hold the shaft 30 in position and in substantial parallelism with the car axle 10.

The brackets 31 and 32 are respectively supported upon the struts 36 and 37 forming part of the truck frame and extending longitudinally thereof and are anchored in position thereon by means of the bolts 38 extending through suitable lugs 39 and 40 respectively at the ends of the brackets 31 and 32 to the transversely extending strut or cross-piece 41 of the truck frame. The brackets 31 and 32 are furthermore secured in position and to the struts 36 and 37 of the truck frame by means of the clamps and bolts generally indicated at 42 and 43 respectively, the clamps engaging the struts which are preferably of channel section as is more clearly shown in Fig. 3, and the bolts extending through suitable lugs 44 and 45 preferably integrally formed with the brackets 31 and 32 respectively and adjacent the journals 33 and 34 in which the shaft 30 is rigidly supported.

As hereinbefore noted, and as is more clearly shown in Fig. 2 of the drawings, the casing 18 supporting the shaft 15 and the gear 13 is adapted to oscillate through the arm 28 and the sleeve 29 about the supporting shaft or bar 30. The sleeve 29 with its associated parts is held against longitudinal movement along the bar 30 by means of the collars 46 and 47 adapted to be rigidly positioned on the shaft 30 and one on each side of the sleeve 29. Referring now to Fig. 4 of the drawings, it will be seen that the housing 18 is provided with an integrally formed lug 48 to which is pivotally secured as at 49 a rod 50 in slidable engagement at its upper end with a journal 51 integrally formed with the bracket 52 secured to the end or cross-piece 41 of the truck frame. A spring 53 surrounds the rod 50 and is interposed between the lug 48 on the housing 18 and the journal 51 on the bracket 52 and by its expansive tendency urges the housing 18 with its associated shaft 15 and gear 13 in a clockwise direction about the supporting shaft 30 as viewed in Fig. 4, thus maintaining the gear 13 in driving connection with the gear 11. Upon the outer end of the rod 50 there is threaded an adjusting nut 54 by means of which the action of the spring 53 and the movement of the gear 13 toward the gear 11 may be adjusted. Thus, as viewed in Fig. 1, the shaft 15 upon which the gear 13 is mounted is maintained in substantial parallelism with the car axle 10 and relative movement between the respective axes of the gears 13 and 11 may readily take place for a purpose to be more clearly hereinafter set forth.

To the other end of the supporting shaft 30 and adjacent the supporting bracket 32 therefor there is rigidly secured in depending relation a gear casing 55 (see Fig. 1) as by the pair of clamping lugs 56 and 57 integrally formed therewith. Associated with each lug 56 and 57 there is a bolt 58 for clamping the gear casing 55 in rigid position with respect to the supporting shaft 30 and associated parts (see Fig. 2). Referring now more particularly to Fig. 1, it will be seen that there is mounted in the casing 55 a shaft 59 rotatably supported in suitable bearings and taking the form preferably of ball bearings indicated at 60 and 61 for supporting the respective ends of the shaft 59. The casing 55 and its supporting lugs 56 and 57 are preferably of such dimensions with respect to the housing 18 and its supporting arm 28 as to position the axis of the shaft 59 at substantially the same distance below the axis of the supporting shaft 30 as is the shaft 15 in the housing 18. Connecting the adjacent ends of the shaft 59 in the casing 55 and of the shaft 15 in the housing 18 are a pair of universal couplings generally indicated at 62 and 63. The couplings 62 and 63 have interposed between the adjacent driving members thereof springs 64 and 65 respectively so that the driving torque is transmitted by the couplings through their respective springs.

Upon the shaft 59 and intermediate of the supporting bearings 60 and 61 therefor there is mounted a bevel gear 66 suitably keyed as by means of the key 67 to the shaft 59 so as to rotate therewith. The bevel gear 66 meshes with a bevel gear 68 mounted upon the shaft 69 supported upon bearings, preferably ball bearings 70 and 71, suitably positioned within the gear casing 55 to position the axis of the shaft 69 at right angles to the axis of the shaft 59 and furthermore to position the axis of the shaft 69 in substantially the horizontal plane of the shaft 59. Suitable means are provided for making the gear casing 55 substantially fluid-tight in order to permit the retention therein of a suitable lubricant for supplying the rotating parts therein with adequate lubrication.

The bevel gears 66 and 68 in the gear casing 55 may conveniently be proportioned as to the number of teeth so that a material increase in the speed of rotation of the gear 68 and its associated shaft 69 with respect to the speed of rotation of the gear 66 is attained. The shaft 69 is adapted to drive a generator 72 supported upon and suitably secured to a pair of struts 73 and 74 extending longitudinally of the main truck frame. The struts 73 and 74 are supported at their outer ends upon an auxiliary end frame or supporting member 75 having lateral arms 76 and 77 secured at the upper ends thereof to the bars 78 and 79 rigidly secured to the side members 80 and 81 respectively of the main truck frame and forming a substantial extension thereof, as is clearly shown in Figs. 1 and 2 of the drawings. The generator supporting struts 73 and 74 are extended inwardly or toward the car axle 10, as is shown in Fig. 3 of the drawings, and the inner ends thereof are secured as by the bolts 82 to suitable lugs 83 integrally formed with and at the under side of the gear casing 55. The supporting struts 73 and 74 are thus not only supported at their inner ends from the main supporting shaft 30 through the gear casing 55, but are also made to maintain the gear casing 55 with its associated mechanisms in proper alignment with the remaining mechanisms and in rigid connection with the main truck frame.

The generator 72 has its shaft 84 connected to the shaft 69 extending through the gear casing 55 as hereinbefore described by means of a flexible coupling comprising a disk 85 of a suitable semi-rigid material to which is connected the yoke 86 positioned on the shaft means of the bolts 89, and to which is in turn connected the yoke 88 positioned on the shaft 84 of the generator by means of the bolts 87 and positioned substantially at right angles to the yoke 86. The connection thus provided permits a ready and convenient installation of the generator 72 in its connection to the driving gear without necessitating an accurate alignment of the respective rotating parts, and the proportioning of the gears 66 and 68 permits of the driving of the generator at a suitable speed with respect to the rate of rotation of the car axle 10.

In the operation of the generator drive hereinbefore described the gear 13 is yieldingly held in driving connection with the gear 11 of the car axle by means of the mounting of the housing 18 carrying the shaft 15 and the gear 13 and the action of the regulating spring 53. The driving of the shaft 15 from the car axle 10 is thus effectively maintained irrespective of the degree of inaccuracy as to roundness of the car axle 10 upon which the gear 11 is mounted and furthermore permits of a relative movement between the two main driving gears to take place in case any foreign material is cast up from the roadbed and into the main driving gears. Furthermore, the latter are of such heavy and rugged construction that their resulting operation is substantially unaffected by such foreign matter and such cinders or fragments from the roadbed are, moreover, readily crushed without detriment to the main driving gears. By constructing the gear 11 of relatively large circular pitch, the teeth of the gear are of a sufficient length as measured in a radial direction so as to permit a relatively great movement to take place between the axis of the gear 13 and the axis of the gear 11 due to the entrance in the gears of foreign matter, and sufficiently great spaces or pockets extending radially and intervening the teeth are thus provided by the above described gear construction so as to readily accommodate flying foreign material therebetween. Furthermore, during such action the teeth being of relatively great length, maintain an effective driving action irrespective of the foreign material pocketed therebetween. The intermeshing gears need not be encased since, as above noted, their continued operation is assured irrespective of interfering outside influences.

By way of example, mention may be made of a main driving gear, such as the gear 11 for example, constructed in accordance with this invention that has been found to give efficient results in practical use. A gear having eight teeth, a circular pitch of about five inches and a tooth length of about three inches has been found to operate efficiently as hereinbefore described and these dimensions are, it will be understood, given merely as illustrative of a possible embodiment of one of the features of this invention. The diameter of the pitch circle of this gear was approximately thirteen inches, making the diametrical pitch or the ratio of the number of teeth on the gear to the diameter of the pitch circle about 0.6 inches.

It is peculiarly inherent in the construction of the main driving gears 11 and 13 as above described to attain the above mentioned advantageous results and also to permit of transmitting energy from the car axle to the generator in a thoroughly dependable manner. It is characteristic of car-axle-generator transmissions in general to be subjected to severe shocks resulting from the sudden starting or stopping of the car. Such severe shocks, however, are relatively ineffectual to detrimentally affect the transmission hereinbefore described since the gears 11 and 13 constructed as above noted, and principally because they are of relatively large pitch, can of themselves effectively resist such suddenly applied thrusts. Furthermore, the interposed universal couplings are effective to transmit the driving torque through suitable springs and not only permit the relative movement between the gears 13 and 11 to take place during operation, but also are effective to absorb in the springs interposed therein the sudden driving torques resulting from such severe shocks and thus safeguard and relieve the subsequent gear trains from possible damage or injury.

It will thus be seen that there has been provided in this invention a generator transmission in which the several objects above set forth, as well as others, are achieved, and that many advantages are attained. It will furthermore be noted that the transmission provided in this invention is of intensely rugged and durable construction so as to insure dependable operation, and that the transmission is of compact and substantially self-contained construction readily and conveniently applied in relation to a car axle. It will furthermore be noted also that the several parts thereof are readily accessible and that the generator transmission on the whole is well adapted to meet exacting requirements of practical use.

As many possible embodiments might be made of this invention and as many changes might be made in the embodiment above set forth, it is to be understood that all matter hereinbefore set forth or shown in the accompanying drawings is to be interpreted as illustrative and not in a limiting sense.

I claim as my invention:

1. In apparatus of the general nature of that herein described, in combination, a car axle, a gear thereon having teeth of sufficient length relative to the pitch diameter to form between adjacent teeth relatively large pockets extending in a radial direction, a gear adapted to be driven from said car axle gear, a generator mounted in substantially fixed relation relative to said car axle, means mounting said second gear to permit it to move toward or away from said car axle gear upon foreign matter lodging therebetween, and means connecting said second-mentioned gear to said generator to drive the latter and adapted to maintain driving connection throughout the relative movement between said two gears.

2. In apparatus of the general nature of that herein described, in combination, a car axle, a gear mounted upon said car axle and having teeth of great length relative to the pitch diameter of said gear to form between adjacent teeth relatively large pockets extending in a radial direction, a second gear adapted to be driven from said gear on said car axle, an electric generator, means forming a yielding driving connection between said generator and said second gear, and means mounting said second gear in driving relation to said car axle gear to permit relative movement to take place therebetween and between said second gear and said generator thereby to accommodate foreign articles in said pockets.

3. In apparatus of the general nature of that herein described, in combination, a car axle, a gear mounted on said car axle having teeth of great length relative to the pitch diameter of said gear thereby to form pockets extending in a radial direction between adjacent teeth, a second gear adapted to be driven from said car axle gear, means mounting said second gear in driving relation to said car axle gear to permit relative movement to take place therebetween and to maintain the axis of said second gear in substantial parallelism with the axis of said car axle gear during said movement, thereby to accommodate in said pockets foreign objects, an electric generator substantially rigidly positioned with respect to said car axle, and means forming a flexible driving connection between said movable second gear and said generator.

4. In apparatus of the general nature of that herein described, in combination, a car axle, a gear mounted on said car axle and having teeth of relatively great length with respect to the pitch diameter of said gear thereby to form pockets extending in a radial direction between adjacent teeth, a second gear adapted to be driven from said car axle gear, means for yieldingly mounting said second gear in driving relation to said car axle gear thereby to accommodate in said pockets foreign objects, an electric generator, and means forming a driving connection between said generator and said second gear, said driving connection being yieldable to permit relative movement between said second gear and said generator upon foreign matter lodging between said two gears.

5. In apparatus of the general nature of that herein described, in combination, a car axle, a truck frame associated therewith, a gear mounted upon said car axle, a shaft extending substantially parallel to said axle and having a gear thereon for coaction with said car axle gear, means supporting said shaft from said truck frame and adapted to permit movement of said shaft and hence of the gear thereon toward or away from said car axle gear, a generator, means yieldingly urging said shaft and the gear thereon toward said car axle gear, means limiting the action of said last-mentioned means, and means including a flexible coupling for connecting said shaft to said generator.

6. In apparatus of the general nature of that herein described, in combination, a car axle, a gear mounted on said car axle having teeth of relatively great length with respect to the pitch diameter of said gear, thereby to form pockets extending in a radial direction between adjacent teeth, a second gear adapted to be driven from said car axle gear, means mounting said second gear in driving relation to said car axle gear to permit relative movement to take place therebetween thereby to accommodate foreign articles in said pockets, an electric generator, a flexible driving connection between said second gear and said generator, and means forming a shock absorbing device interposed between said second gear and said generator.

7. In apparatus of the general nature of that herein described, in combination, a car axle, a gear mounted on said car axle, an auxiliary shaft, means forming a housing for said shaft and for rotatably supporting said shaft in substantial parallelism with said car axle, a gear mounted upon said shaft and adapted to be driven from said car axle gear, means mounting said housing to permit relative movement to take place therebetween and said car axle and to maintain the axis of said auxiliary shaft in substantial parallelism with said car axle during said movement, an electric generator, and means forming a flexible driving connection between said auxiliary shaft and said generator.

8. In apparatus of the general nature of that herein described, in combination, a car axle, a truck frame associated therewith, a gear mounted upon said car axle, an auxiliary shaft, a gear mounted upon said shaft and adapted to be driven from said car axle gear, means for pivotally mounting said auxiliary shaft on said truck frame, to permit said auxiliary shaft and its associated gear to move toward or away from said car axle gear, means for yieldingly forcing said auxiliary shaft and the associated gear toward said car axle thereby to maintain said two gears in driving connection, an electric generator mounted upon said truck frame, and means forming a flexible driving connection between said auxiliary shaft and said generator.

9. In apparatus of the general nature of that herein described, in combination, a car axle, a truck frame associated therewith, a gear rigidly mounted upon said car axle, a second gear in driving connection with said car axle gear, a generator mounted upon said truck frame, means forming a driving connection between said second gear and said generator and including a train of gears for changing the speed of rotation of said generator relative to the speed of rotation of said second gear and shock absorbing means interposed between said car axle gear and said generator.

10. In apparatus of the general nature of that herein described, in combination, a car axle, a truck frame associated therewith, a gear mounted upon said car axle, a second gear adapted to be driven from said car axle gear, an electric generator mounted upon said truck frame, means forming a driving connection between said second gear and said generator and including a gear train for changing the speed of rotation of said generator relative to that of said second gear, and shock absorbing means interposed in said driving connection and between said second gear and said gear train.

11. In apparatus of the general nature of that herein described, in combination, a car axle, a truck frame associated therewith, a gear mounted upon said car axle, a second gear in driving connection with said car axle gear, a generator mounted upon said truck frame, means forming a driving connection between said second gear and said generator and including a train of gears for changing the speed of rotation of said generator relative to the speed of rotation of said second gear, and a flexible coupling interposed in said driving connection and between said gear train and said second gear.

12. In apparatus of the general nature of that herein described, in combination, a car axle, a truck frame associated therewith, a gear mounted upon said car axle, an auxiliary shaft adjacent said car axle and adapted to be driven from said car axle gear, a main supporting bar rigidly mounted on said truck frame and in substantial parallelism with said car axle, means for pivotally suspending said auxiliary shaft and associated gear from one end of said supporting bar, thereby to permit said second gear to swing toward or away from said car axle gear and about said supporting bar, a gear train having a casing rigidly suspended from the other end of said supporting bar and having a shaft extending through said casing and in substantial alignment with said auxiliary shaft, means forming a flexible coupling for placing said two shafts in driving connection, an electric generator mounted upon said truck frame, and means forming a driving connection between said gear train and said generator.

13. In apparatus of the general nature of that herein described, in combination, a car axle, a truck frame associated therewith, a gear having teeth of relatively great length with respect to the pitch diameter thereof thereby to form pockets extending in a radial direction between adjacent teeth, said gear being formed in two parts, means for clamping said two parts of said gear in assembled relation on said car axle, a second gear, means mounting said second gear in driving relation to said car axle gear and to permit said second gear to move toward or away from said car axle gear, an electric generator fixedly supported by said truck frame, and means forming a driving connection between said second gear and said electric generator and adapted to permit the former to move relative to the latter.

14. In apparatus of the general nature of that herein described, in combination, a car axle, a gear mounted upon said car axle and having a circular pitch relatively great with respect to the pitch diameter of said gear, whereby the teeth of said gear are of relatively great thickness and of relatively great length to form between adjacent teeth pockets extending in a radial direction, a second gear mating with said first-mentioned gear and having teeth in such number that it is driven therefrom at substantially the same speed as said first-mentioned gear, means mounting said second gear to permit relative movement to take place therebetween and said car axle gear, an electric generator, and means forming a driving connection between said second gear and said generator and adapted to permit the former to move relative to the latter, said driving connection including speed-change mechanism.

15. In apparatus of the general nature of that herein described, in combination, a car axle, a gear mounted upon said car axle, a second gear, means mounting said second gear in driving relation to said car axle gear and adapted to permit said second gear to move toward or away from said first gear, an electric generator mounted in substantially fixed relation relative to said first-mentioned gear, means forming a driving connection between said second gear and said generator adapted to permit the former to move relative to the latter, means for yieldingly holding said second gear in driving relation with said car axle gear, and means for limiting the movement of said second gear toward said car axle gear.

16. In apparatus of the general nature of that herein described, in combination, a car axle, a gear mounted upon said car axle, a second gear, means mounting said second gear in driving relation to said car axle gear and adapted to permit said second gear to move toward or away from said first gear, an electric generator, means forming a driving connection between said second gear and said generator, means for yieldingly holding said second gear in driving relation with said car axle gear, and adjustable means for limiting the movement of said second gear toward said car axle gear.

17. In apparatus of the general nature of that herein described, in combination, a car axle, a truck frame associated therewith, a main supporting bar rigidly mounted on said truck frame and in substantial parallelism with said car axle, a gear train having a casing rigidly suspended from one end of said supporting bar and having a driving shaft extending in substantial parallelism to said car axle and a driven shaft extending substantially transversely of and in a direction away from said car axle, means forming a driving connection between said car axle and said driving shaft associated with said gear train, a generator supporting platform extending transversely to said car axle having one end thereof secured to the under side of said suspended casing, means for suspending the other end of said transversely extending platform from said truck frame, and a generator mounted thereon and having its shaft in driving connection with said transversely extending driven shaft associated with said casing.

18. In apparatus of the general nature of that herein described, in combination, a car axle, a truck frame associated therewith, a main supporting bar rigidly mounted on said truck frame and in substantial parallelism with said car axle, a gear train having a casing rigidly suspended from one end of said supporting bar and having a driving shaft extending in substantial parallelism to said car axle and a driven shaft extending substantially transversely of and in a direction away from said car axle, means forming a driving connection between said car axle and said driving shaft associated with said gear train, a generator supporting platform extending transversely to said car axle having one end thereof secured to the under side of said suspended casing, means for suspending the other end of said transversely extending platform from said truck frame, a generator rigidly mounted upon said platform and having its shaft in substantial alignment with said transversely extending driven shaft associated with said casing, and a flexible coupling connecting said generator shaft and said driven shaft.

19. In apparatus of the general nature of that herein described, in combination, a car axle, a truck frame associated therewith, a main supporting bar rigidly mounted on said truck frame and in substantial parallelism with said car axle, a gear train having a casing rigidly suspended from one end of said supporting bar and having a shaft extending through said casing and in substantial parallelism with said car axle and having also a second shaft extending through said casing substantially transversely to said car axle, an auxiliary shaft pivotally suspended from the other end of said supporting bar in substantial parallelism to said car axle and in substantial alignment with said first-mentioned shaft in said casing, means forming a driving connection between said auxiliary shaft and said car axle, a flexible coupling interposed between said auxiliary shaft and said first-mentioned shaft, a supporting platform having one end suspended from the end of said gear casing and having its other end supported from said truck frame, and a generator rigidly mounted on said supporting platform and having its shaft in substantial alignment with said second-mentioned shaft associated with said casing and in driving connection therewith.

20. In apparatus of the general nature of that herein described, in combination, a car axle, a truck frame associated therewith, a main supporting bar rigidly mounted on said truck frame and in substantial parallelism with said car axle, a gear train having a casing rigidly suspended from one end of said supporting bar and having a shaft extending through said casing and in substantial parallelism with said car axle and having also a second shaft extending through said casing substantially transversely to said car axle, an auxiliary shaft pivotally suspended from the other end of said supporting bar in substantial parallelism to said car axle and in substantial alignment with said first-mentioned shaft in said casing, means forming a driving connection between said auxiliary shaft and said car axle, means forming a shock absorbing driving connection between said auxiliary shaft and said first-mentioned shaft associated with said casing, a supporting platform having one end suspended from the end of said gear casing and having its other end supported from said truck frame, and a generator rigidly mounted on said supporting platform and having its shaft in substantial alignment with said second-mentioned shaft associated with said casing and in driving connection therewith.

21. In apparatus of the general nature of that herein described, in combination, a car axle, a gear mounted upon said car axle and having teeth of great length relative to the pitch diameter of said gear to form between adjacent teeth relatively large pockets extending in a radial direction, a second gear adapted to be driven from said car axle gear and having also teeth of great length relative to the pitch diameter to form between adjacent teeth relatively large pockets extending in a radial direction, said gears being thereby adapted to accommodate foreign articles in said pockets, an electric generator, and means forming a driving connection between said generator and said second gear.

22. In apparatus of the general nature of that herein described, in combination, a car axle, a truck frame associated therewith, a shaft extending substantially parallel to said axle and rotatably supported by said truck frame, a shaft axially alined with said first-mentioned shaft, means forming a yielding coupling between said two shafts, an electric generator, means forming a driving connection between said generator and said first-mentioned shaft, means rotatably supporting said second-mentioned shaft from said truck frame and adapted to permit movement thereof toward or away from said car axle, and means including two toothed members forming a driving connection between said second-mentioned shaft and said car axle.

23. In apparatus of the general nature of that herein described, in combination, a car axle, a truck frame associated therewith, a shaft extending substantially parallel to said axle and rotatably supported by said truck frame, a shaft axially alined with said first-mentioned shaft, means forming a yielding coupling between said two shafts, an electric generator, means forming a driving connection between said generator and said first-mentioned shaft, means rotatably supporting said second-mentioned shaft from said truck frame and adapted to permit movement thereof toward or away from said car axle, means including two toothed members forming a driving connection between said second-mentioned shaft and said car axle, and means for predetermining at will the distance between said car axle and said second-mentioned shaft.

24. In apparatus of the general nature of that herein described, in combination, a car axle, a truck frame associated therewith, a shaft extending substantially parallel to said axle and rotatably supported by said truck frame, a shaft axially alined with said first-mentioned shaft, means forming a yielding coupling between said two shafts, an electric generator, means forming a driving connection between said generator and said first-mentioned shaft, means rotatably supporting said second-mentioned shaft from said truck frame and adapted to permit movement thereof toward or away from said car axle, means including two toothed members forming a driving connection between said second-mentioned shaft and said car axle, and means including a spring for holding said second-mentioned shaft relative to said car axle.

25. In apparatus of the general nature of that herein described, in combination, a car axle, a truck frame associated therewith, a shaft extending substantially parallel to said axle and rotatably supported by said truck frame, a shaft axially alined with said first-mentioned shaft, means forming a yielding coupling between said two shafts, a generator having its shaft extending in a direction substantially transverse to said car axle, means including a yielding driving connection for driving said generator shaft from said first-mentioned shaft, means rotatably supporting said second-mentioned shaft from said truck frame and adapted to permit movement thereof toward or away from said car axle, and means including two toothed members for driving said second-mentioned shaft from said car axle.

26. In apparatus of the general nature of that herein described, in combination, a car axle, a truck frame associated therewith, a shaft extending substantially parallel to said axle and rotatably supported by said truck frame, a shaft axially alined with said first-mentioned shaft, means forming a yielding coupling between said two shafts, a generator, means for supporting said generator by said truck frame, gearing forming a driving connection between said first-mentioned shaft and said generator, means including two toothed members forming a driving connection between said second-mentioned shaft and said car axle, and means rotatably supporting said second-mentioned shaft from said truck frame and adapted to permit movement thereof toward or away from said car axle.

27. In apparatus of the general nature of that herein described, in combination, a car axle, a truck frame associated therewith, a gear on said car axle, a shaft extending substantially parallel to said axle and having a gear thereon for coaction with said car axle gear, a hanger pivotally supported from said truck frame and having bearing means in which said shaft is rotatably mounted, spring means acting upon said hanger for urging the latter and said shaft and gear in a direction toward said car axle, means limiting the action of said spring means, a generator, and means forming a driving connection between said shaft and said generator while permitting relative movement between said generator and said shaft.

28. In apparatus of the general nature of that herein described, in combination, a car axle, a truck frame associated therewith, a shaft rotatably supported by said truck frame, a generator, gearing forming a driving connection between said shaft and said generator, and means forming a driving connection between said shaft and said car axle, said means including a pair of toothed members one of which is on said car axle, and a shock-absorbing means interposed between said car axle toothed member and said shaft.

In testimony whereof, I have signed my name to this specification this 4th day of February, 1922.

BASSETT M. COFFEE.